United States Patent
Bandhauer et al.

(10) Patent No.: US 9,704,384 B2
(45) Date of Patent: Jul. 11, 2017

(54) BATTERY MANAGEMENT SYSTEMS WITH THERMALLY INTEGRATED FIRE SUPPRESSION

(71) Applicant: Lawrence Livermore National Security, LLC, Livermore, CA (US)

(72) Inventors: Todd M. Bandhauer, Livermore, CA (US); Joseph C. Farmer, Tracy, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 255 days.

(21) Appl. No.: 13/786,163

(22) Filed: Mar. 5, 2013

(65) Prior Publication Data

US 2013/0316198 A1    Nov. 28, 2013

Related U.S. Application Data

(60) Provisional application No. 61/650,649, filed on May 23, 2012, provisional application No. 61/650,359, filed on May 22, 2012.

(51) Int. Cl.
| | |
|---|---|
| *H01M 10/613* | (2014.01) |
| *H01M 10/6556* | (2014.01) |
| *H01M 10/48* | (2006.01) |
| *G08C 17/02* | (2006.01) |
| *H01M 10/6568* | (2014.01) |
| *H01M 10/6551* | (2014.01) |
| *H01M 10/647* | (2014.01) |
| *H01M 10/052* | (2010.01) |

(52) U.S. Cl.
CPC .......... *G08C 17/02* (2013.01); *H01M 10/613* (2015.04); *H01M 10/6551* (2015.04); *H01M 10/6556* (2015.04); *H01M 10/6568* (2015.04); *H01M 10/052* (2013.01); *H01M 10/486* (2013.01); *H01M 2200/00* (2013.01)

(58) Field of Classification Search
CPC .................................................... H01M 10/50
See application file for complete search history.

(56) References Cited

U.S. PATENT DOCUMENTS

| | | | | |
|---|---|---|---|---|
| 5,607,787 | A * | 3/1997 | Wedlake et al. ............... | 429/62 |
| 6,033,800 | A * | 3/2000 | Ichiyanagi et al. ........... | 429/176 |
| 6,106,972 | A * | 8/2000 | Kokubo et al. ............... | 429/120 |

(Continued)

FOREIGN PATENT DOCUMENTS

| | | | | |
|---|---|---|---|---|
| DE | WO 2010089000 A2 * | 8/2010 | .......... | H01M 2/1252 |
| WO | 2010025761 A1 | 3/2010 | | |

(Continued)

*Primary Examiner* — Jonathan Crepeau
*Assistant Examiner* — Jacob Buchanan
(74) *Attorney, Agent, or Firm* — Eddie E. Scott

(57) ABSTRACT

A thermal management system is integral to a battery pack and/or individual cells. It relies on passive liquid-vapor phase change heat removal to provide enhanced thermal protection via rapid expulsion of inert high pressure refrigerant during abnormal abuse events and can be integrated with a cooling system that operates during normal operation. When a thermal runaway event occurs and sensed by either active or passive sensors, the high pressure refrigerant is preferentially ejected through strategically placed passages within the pack to rapidly quench the battery.

3 Claims, 3 Drawing Sheets

(56) References Cited

U.S. PATENT DOCUMENTS

| | | |
|---|---|---|
| 8,084,154 B2 | 12/2011 | Scheucher et al. |
| 2003/0232239 A1* | 12/2003 | Gow et al. .................... 429/120 |
| 2005/0038614 A1* | 2/2005 | Botts .................. G01R 31/3606 |
| | | 702/63 |
| 2006/0204840 A1* | 9/2006 | Jeon et al. .................... 429/152 |
| 2009/0059528 A1* | 3/2009 | Damsohn ........... B60H 1/00278 |
| | | 361/701 |
| 2009/0123819 A1* | 5/2009 | Kim ...................... H01M 2/105 |
| | | 429/120 |
| 2009/0246606 A1* | 10/2009 | Shimizu .............. H01M 10/625 |
| | | 429/62 |
| 2010/0275619 A1* | 11/2010 | Koetting ............ H01M 10/613 |
| | | 62/79 |
| 2011/0001484 A1* | 1/2011 | Stits et al. .................... 324/426 |
| 2012/0070703 A1* | 3/2012 | Wahl .................. H01M 2/1252 |
| | | 429/53 |
| 2012/0182021 A1 | 7/2012 | McCoy et al. |
| 2012/0231304 A1* | 9/2012 | Kaiser et al. .................. 429/50 |

FOREIGN PATENT DOCUMENTS

| | | | | |
|---|---|---|---|---|
| WO | WO 2011020616 A1 * | 2/2011 | ............ H01M 10/50 |
| WO | 2012097965 A2 | 7/2012 | |

\* cited by examiner

BATTERY MANAGEMENT SYSTEMS WITH THERMALLY INTEGRATED FIRE SUPPRESSION

CROSS-REFERENCE TO RELATED APPLICATIONS

This application claims benefit under 35 U.S.C. §119(e) of U.S. Provisional Patent Application No. 61/650,359 filed May 22, 2012 entitled "Thermally Integrated Fire Suppression System for Lithium-Ion Battery Packs" and U.S. Provisional Patent Application No. 61/650,649 filed May 23, 2012 entitled "Lithium Ion Battery Management System with Distributed Wireless & Fiber Optic Sensors, and Embedded Fire Suppression System. The disclosure of U.S. Provisional Patent Application No. 61/650,359 and No. 61/650,649 are hereby incorporated herein by reference in its entirety for all purposes.

U.S. patent application Ser. No. 13/772,620 filed Feb. 21, 2013 entitled "Battery Management System with Distributed Wireless Sensors" discloses and claims invention(s) related to the subject invention. U.S. patent application Ser. No. 13/772,620 filed Feb. 21, 2013 is hereby incorporated herein by reference in its entirety for all purposes.

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present invention relates to batteries and more particularly to a battery management systems with thermally integrated fire suppression.

State of Technology

The most critical issue facing widespread adoption of rechargeable lithium ion batteries in large scale, vehicular applications is safety. Once these batteries reach internal temperatures of approximately 90° C., self-sustaining exothermic reactions trigger dangerous thermal runaway. The cause of these events can be internal or external short from a variety of causes, included crushing, containment penetration, external heating events, or manufacturing defects. In addition, these batteries are also significantly overdesigned to compensate capacity loss through cycling at moderately high temperatures, with significant capacity loss occurring above ~50° C. for virtually every commercially applicable cell chemistry. Furthermore, these batteries contain a low thermal conductivity plastic (e.g., polyethylene or polypropylene) separator soaked in a non-aqueous electrolytic solution. As a result, when multiple cells are stacked together, it is difficult to remove heat from the more thermally insulated portions of the battery. This makes mitigation of thermal runaway even more difficult, and can cause localized cycling of the battery, which can lead to premature aging.

International Patent Application No. WO 2010/025761 for a system for fire protection provides the state of technology information quoted below. International Patent Application No. WO 2010/025761 is incorporated herein by this reference.

"Power transmission networks sometimes utilize backup power systems, for example in order to compensate for varying power generation or load, or in the case of loss of power. This can for example be the case in wind- or solar power systems. The backup power system provides power during fluctuations of the generated wind or solar power and even during power outages."

"Such backup power systems rely on a bank of batteries to store enough energy to even out the power fluctuations. In power transmission networks such battery storage systems may consist of a large amount of battery cells connected in series and parallel to reach sufficiently high voltage levels and high power and energy. The voltage levels may be in the order of several tens of kV and power capability up to several 10 MWs or even in the order of 100 MW. To achieve this, such battery energy storage systems will comprise several thousands battery cells."

"The batteries of the backup power thus contain high amount of energy, and a failing battery cell, e.g. by external or internal short circuit or overload, will quickly become very hot. The heat emitted from the failing cell will heat up an adjacent battery cell, which in turn will heat up the next cell and so on, and this of course constitutes a huge fire hazard. As an example, Li-ion battery cells exceeding a critical temperature may result in opening of the cell, known as venting of the cell, with a release of highly inflammable gases that can easily catch fire. If this happens there is a large risk of the whole battery storage system being destroyed."

"The gases released from Li-ion battery cells may contain a mixture of hydrogen, carbon monoxide, carbon dioxide, methane, ethane, methylene, propylene, organic carbonates and also carbon powder. The battery backup systems are therefore usually protected by temperature sensors detecting heat of a fire and by fire extinguishing means, for example argonite based fire extinguishers. Argonite gas is injected rapidly into the storage room within which the battery backup is stored, when the temperature sensors detect an abnormal temperature."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides monitoring parameters of an energy storage system that includes one or more energy storage packs having a multiplicity of individual energy storage cells. The present invention has sensors connected to each of the individual energy storage cells for identification and detection of the parameters of each individual energy storage cell. A management system monitors the information provided by the sensor regarding parameters of each individual energy storage cell. The parameters include one or more of the following parameters: cell voltage, cell current, cell impedance, cell temperature, cell internal pressure, stress and strain in the cell, electrolyte leakage, gas evolution and leakage, optical and nuclear particle transmission and scattering, and/or pyrotechnic displays.

In various embodiments, the present invention provides a system for monitoring a very large number of spatially-distributed parameters in a high-capacity electrochemical energy storage system, where each parameter is indicative of the energy storage system's "state of health" and "operational safety." The energy storage system includes one or more energy storage packs having a multiplicity of individual energy storage cells. The present invention utilizes sensors to monitor individual energy storage cells. These sensors are used to identify and detect operational parameters for each individual energy storage cell in a much larger series-parallel array. A management system monitors the information from the sensors regarding the parameters of each individual energy storage cell. The parameters include one or more of the following parameters: cell voltage, cell current, cell impedance, cell temperature, cell internal pressure, stress and strain in the cell, electrolyte leakage, gas evolution and leakage, optical and nuclear particle transmission and scattering, and/or pyrotechnic displays.

In various embodiments, the present invention provides a thermal management system that is integral to the battery pack and/or individual cells that rely on liquid-vapor phase change heat removal that provides enhanced thermal protection via rapid expulsion of inert high pressure refrigerant during abnormal abuse events and can be integrated with a cooling system that operates during normal operation. During normal operation when a thermal runaway event occurs and sensed by either active or passive sensors, the high pressure refrigerant is preferentially ejected through strategically placed passages within the pack to rapidly quench the battery. This quenching can occur locally within a small section of pack so that other portions that initiate thermal runaway at a later point in time can be mitigated on demand. Care must be taken to select a refrigerant that is not reactive with components in the battery, especially lithium. Common fire suppressants include $CO_2$ and R125, which the latter has a high enthalpy of vaporization (164 kJ/kg), a low saturation temperature at atmospheric pressure (−48.4° C.). The internal cooling system can store excess liquid refrigerant for quenching, which merely 1 kg of R125, for example, unleashes a massive cooling power of nearly 2 MW when released in 0.1 s. This liquid can be stored at each modular internal cooling structure, adding minimal weight and volume to a large battery pack, which can weigh in excess of 100 kg in some applications.

Ejecting the refrigerant (when an abuse event is sensed) to initiate rapid quenching of the battery significantly mitigates the risk of a dangerous explosion. This refrigerant can be stored in a separate modular storage system in the high pressure liquid phase, or be connected to a thermal management system that contains the refrigerant and is used to cool the battery during normal operation. Integrating the cooling channels into the battery pack substantially reduces the thermal resistance from the heat generation locations to the cooling fluid. In addition, due to the constant-temperature passive phase change process, both individual cells and the entire pack can be cooled uniformly, which can lead to longer living packs with reduced overdesign to compensate premature aging. As a result, this technology, which is analogous to have modular fire extinguishers within the pack, will make battery packs safer and live longer, enabling widespread adoption of rechargeable large lithium-ion packs for vehicular applications.

The present invention has use in hybrid and fully electric vehicles, unmanned vehicles, submarines, airplanes, and tactical vehicles. The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF SPECIFIC EMBODIMENTS

Figure 1:
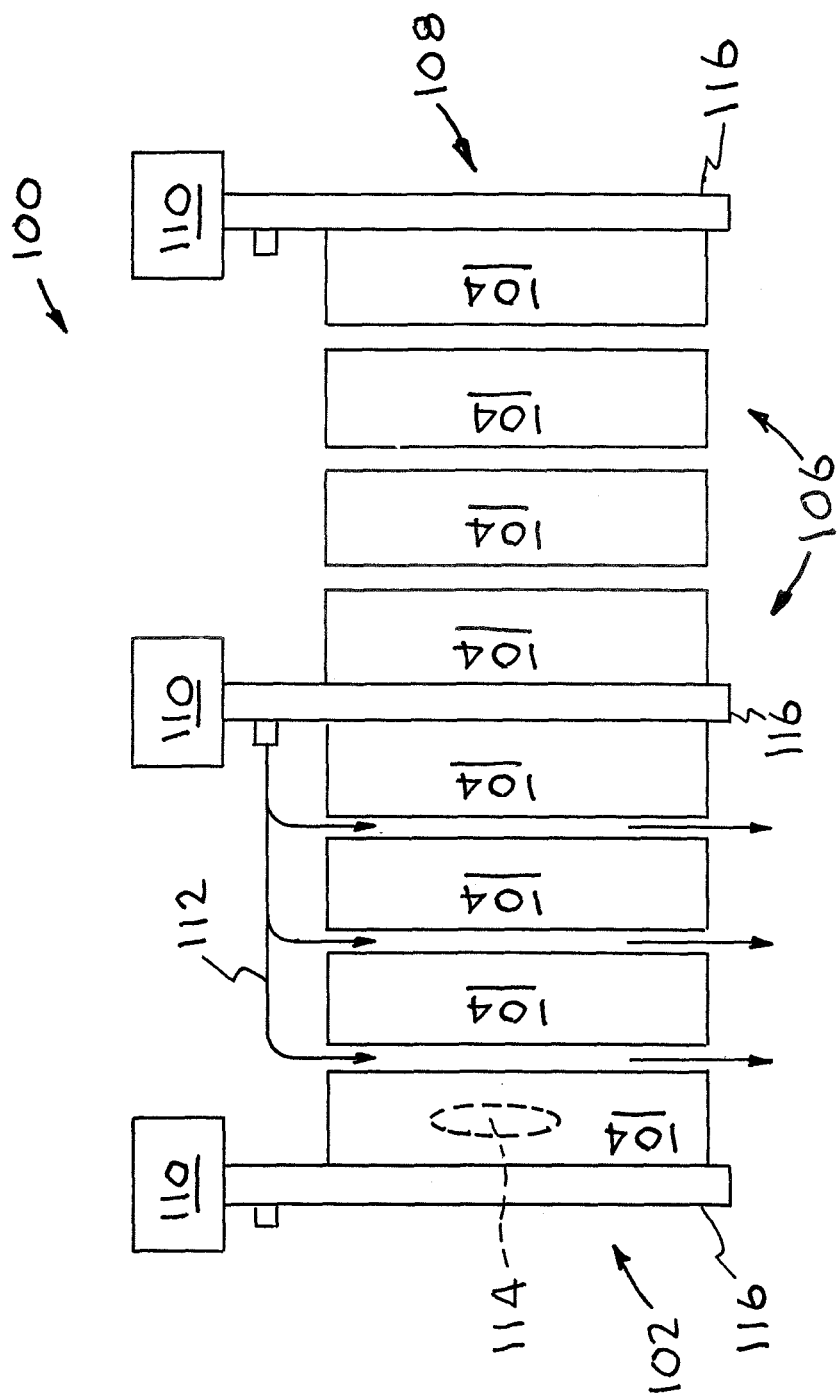
FIG. 1 illustrates one embodiment of a battery management system with a thermally integrated fire suppression system of the present invention.

Referring to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings and in particular to FIG. 1, an embodiment of a battery management system with a thermally integrated fire suppression system of the present invention is illustrated. The battery management system with a thermally integrated fire suppression system is designated generally by the reference numeral 100.

As illustrated in FIG. 1, the system 100 includes any number of lithium ion battery modules or lithium ion battery packs 102 within a housing. Each individual lithium ion battery module or pack 102 includes any number of individual lithium ion battery cells 104. The lithium ion battery module or pack 102 may for example comprise a number of series-connected and/or parallel-connected lithium ion battery cells 104 housed within the lithium ion battery pack housing.

Each individual lithium ion battery module or pack 102 includes any number of individual lithium ion battery cells 104 and a corresponding number of sensors (Not Shown in FIG. 1). A battery management system (Not Shown in FIG. 1) is operatively connected to the lithium ion battery module or pack 102, the lithium ion battery cells 104, and the sensors. The sensors and the will be illustrated and described in the additional drawings and specification.

Once the lithium ion battery cells 104 reach internal temperatures of approximately 90° C., self-sustaining exothermic reactions can trigger dangerous thermal runaway. The cause of these events can be internal or external short from a variety of causes, included crushing, containment penetration, external heating events, or manufacturing defects. The triggered thermal runaway event is illustrated as the symbol 114.

The system 100 is a battery management system with a thermally integrated fire suppression system. The system 100 includes a battery pack 102 with integrated cooling sheets 116 that contain both an evaporator 108 and an external condenser 110. During normal operation, heat generated by the cells is transferred to the evaporator 108, where the refrigerant is evaporated. The refrigerant is then transported to the external condenser 110, where the refrigerant is cooled by rejecting heat to a cooling fluid. Once condensed, the refrigerant is passively transported back to the evaporator through a combination of surface tension and gravitational forces. These cooling sheets 116 are place around individual cells 104. Once a thermal event at location 114 or similar is detected, the high pressure refrigerant can be released from the cooling sheet and preferentially directed through channels 112 created by spacing the cells 104 apart. The cooling sheets 116 can be linked together to create a modular linked design 106 to enable refrigerant from one cooling sheet to be injected into the battery pack 102.

As illustrated in FIG. 1, an additional or alternative fire suppressant pathway 112 is provided. The fire suppressant pathway 112 make is feasible to inject the coolant directly into the housing to initiate more rapid quenching. The cooling sheets 116 can be linked together to create a modular linked design 106 to enable refrigerant from one cooling sheet to be injected into cooling passages 112 located nearby another cooling sheet in the battery pack 102.

Additional embodiments of the battery management system with a thermally integrated fire suppression system 100 are part of the invention. The additional embodiment's include (1) A system with multiple electrochemical cells and cooling passages between cells, a fire suppression system, and RFID sensors, where the sensors trigger the fire suppression system to inject a phase change refrigerant into the cooling passages when cells exhibit thermal runaway to thermally quench the cells, i.e., no connection to cooling system during normal operation, (2) the system where the fire suppression system has cylinders containing high pressure refrigerant and are linked together, (3) the system where the refrigerant thermally quenches and dilutes combustible mixtures emanating from the battery during thermal runaway, (4) a system with multiple electrochemical cells, a fire suppression system, and RFID sensors, where the sensors trigger the fire suppression system to inject a phase change refrigerant directly into the cells that exhibit thermal runaway to thermally quench the cells, (5) the system with passages between the cells that contain an internal cooling structure, (6) the system with an internal cooling structure integrated into each individual cell, and (7) the system with dry fire suppressing agents like LITH-X.

Figure 2:
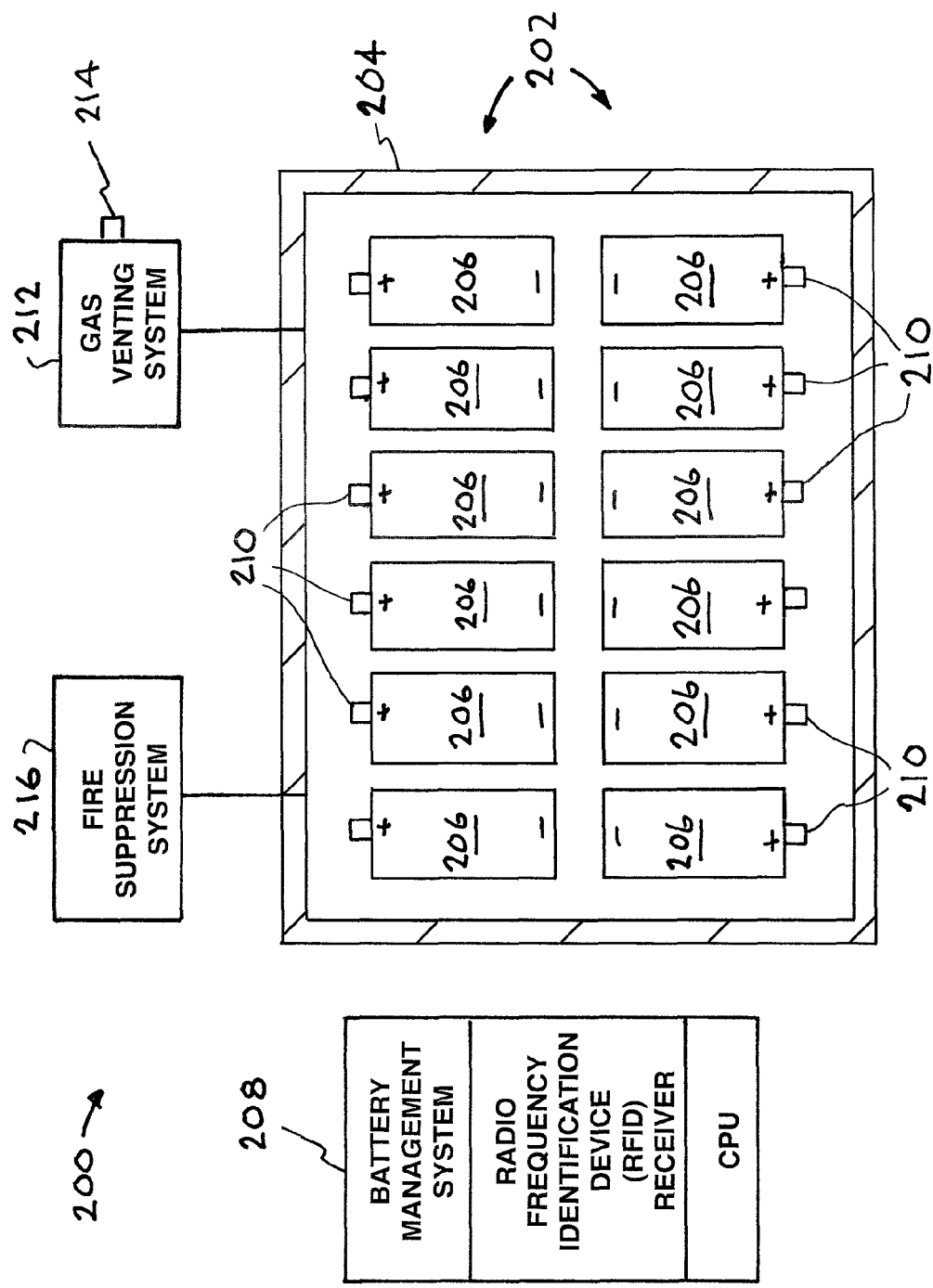
FIG. 2 illustrates another embodiment of the invention having individual lithium ion battery cells and a corresponding number of Radio Frequency Identification (RFID) sensors.

Referring now to FIG. 2, an embodiment of a lithium ion battery management system constructed in accordance with the present invention is illustrated. The system is designated generally by the reference numeral 200. The system 200 includes any number of lithium ion battery modules or lithium ion battery packs 202 within a housing 204. Each individual lithium ion battery module or pack 202 includes any number of individual lithium ion battery cells 206. The lithium ion battery module or pack 202 may for example comprise a number of series-connected and/or parallel-connected lithium ion battery cells 202 housed within the lithium ion battery pack housing 204.

Each individual lithium ion battery module or pack 202 includes any number of individual lithium ion battery cells 206 and a corresponding number of Radio Frequency Identification (RFID) sensors 210. A gas venting system 212 is connected to the housing 204. A Radio Frequency Identification (RFID) sensor 214 is connected to the gas venting system 212. A remote lithium ion battery management system 208 is operatively connected to the lithium ion battery module or pack 202, the lithium ion battery cells 206, the Radio Frequency Identification (RFID) sensors 210 in the housing 204, and the Radio Frequency Identification (RFID) sensor 214 connected to the gas venting system 212.

The system 200 provides an advanced lithium ion battery management system for the lithium ion battery module or pack 202 and the lithium ion battery cells 206 using the Radio Frequency Identification (RFID) sensors 210. The system 200 includes a fire suppression system 216 operatively connected to the housing 204 and the lithium ion battery management system 208. The system 200 enables detection of various events in the lithium ion battery module or pack 202 and the lithium ion battery cells 206. The remote lithium ion battery management system 208 enables remedial action using the fire suppression system 216.

Referring again to FIG. 2, a system is illustrated that in one embodiment can consist of large series-parallel arrays of high performance lithium ion battery cells. The system 200 enables the early detection of various events in the high capacity lithium ion battery packs to provide rapid response to prevent and suppress such events before the results become catastrophic. The distributed wireless sensors 210/214 enable the detection of various parameter including one or more of the following parameters: cell voltage, cell current, cell impedance, cell temperature, cell internal pressure, stress and strain in the cell package, electrolyte leakage, gas evolution and leakage, optical and nuclear particle transmission and scattering, and any pyrotechnic displays internal to the lithium ion battery pack that may be attributed to the onset of thermal runaway. The sensors 210/214 may be either active or passive, with communication possible via the RFID components. Once the sensors 210/214 detect the onset of an event, the signal is used to appropriately manage pack operation (charge and discharge), and remedial action systems will be activated. The remote lithium ion battery management system 208 enables remedial action using the fire suppression system 216.

The system 200 also leverages specialized computer models and codes as control algorithms in a smart lithium ion battery management system (BMS) unique attributes, enables simultaneous solution of those equations that account for the flow of fluid and heat, chemical reactions, current flow and mechanical stress. The equations that describe electrode kinetics and ionic transport will be integrated into the code. This modeling enables designers to account for subtle, but very important effects such as damage of local circuitry and other vehicular components by the pyrotechnic venting of hot gases. Effective cooling systems, and engineered "fire breaks" and "internal fire suppression methods" can be included. The system 200 has many uses, for example the system 200 has use in connection with high capacity lithium ion lithium ion battery packs for electric and hybrid-electric vehicles, naval systems, aerospace systems, grid storage, and uninterruptable power supplies.

Figure 3:
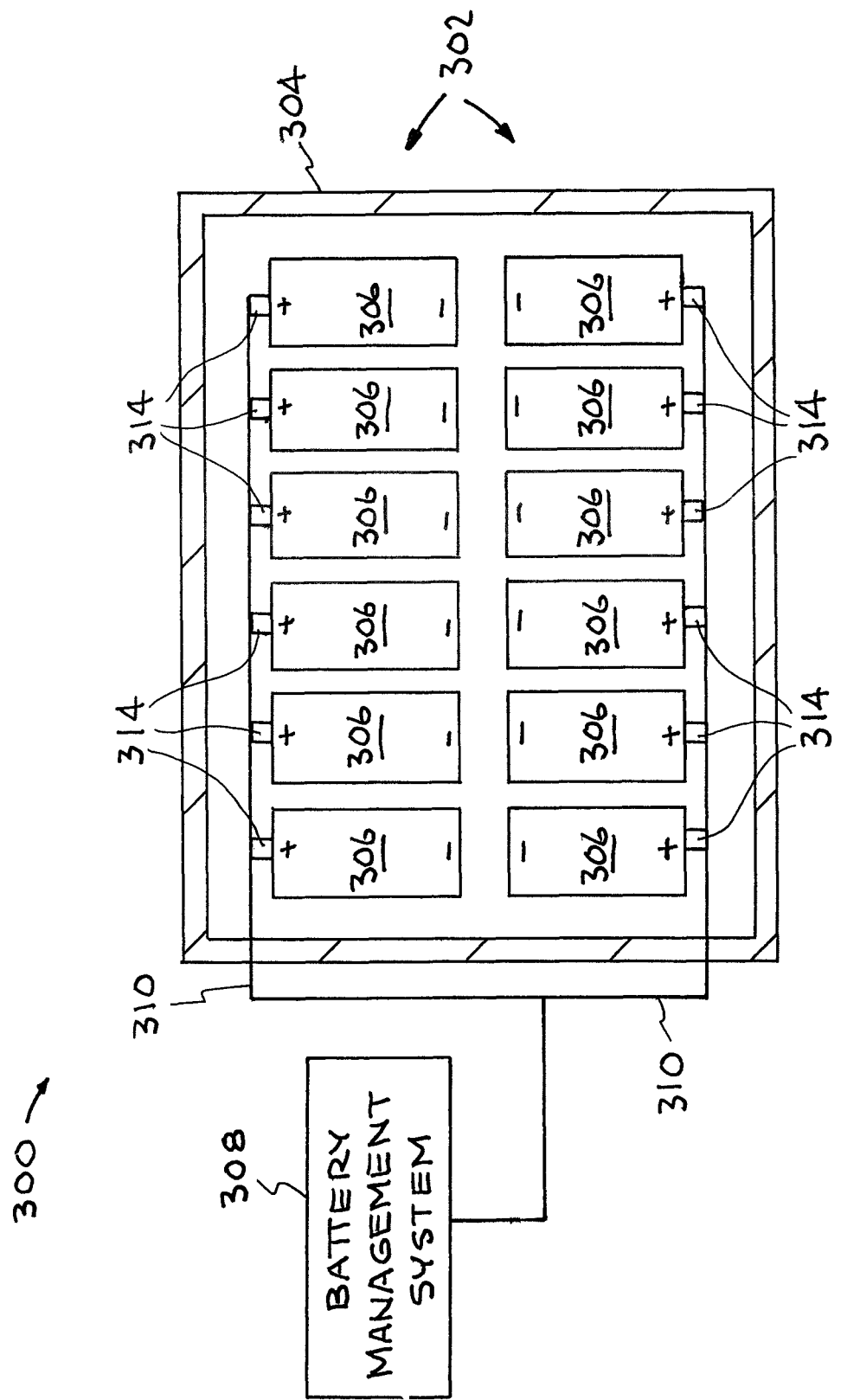
FIG. 3 illustrates another embodiment of the invention having individual lithium ion battery cells and a corresponding number of sensors connected by optical fibers.

Referring now to FIG. 3, another embodiment of a battery management system constructed in accordance with the present invention is illustrated. The system is designated generally by the reference numeral 300. The system 300 includes any number of battery modules or battery packs 302 within a battery pack housing 304. Each individual battery module or pack 302 includes any number of individual battery cells 306. The battery module or pack 302 may for example comprise a number of series-connected and/or parallel-connected battery cells 302 housed within the battery pack housing 304. A sensor 314 is connected to each battery cell 302. The sensors 314 are connected to an optical fiber 310. A remote battery management system 308 is operatively connected to the battery cells 306 and the sensors 314 by the optical fibers 310.

The system 300 provides an advanced battery management system for the battery module or pack 302 and the battery cells 306 using the sensors 314 and the optical fibers 310. The system 300 enables detection of various events in the battery module or pack 302 and the battery cells 306. The remote battery management system 308 enables remedial action.

Referring again to FIG. 3, a system is illustrated that in one embodiment can consist of large series-parallel arrays of high performance battery cells. The system 300 enables the early detection of various events in the high capacity battery packs to provide rapid response to prevent and suppress such events before the results become catastrophic.

The sensors 314 enable the detection of various parameter including one or more of the following parameters: cell voltage, cell current, cell impedance, cell temperature, cell internal pressure, stress and strain in the cell package, electrolyte leakage, gas evolution and leakage, optical and nuclear particle transmission and scattering, and any pyrotechnic displays internal to the battery pack that may be attributed to the onset of thermal runaway. Once sensors 314 detect the onset of an event, the signal is used to appropriately manage pack operation (charge and discharge), and remedial action systems will be activated.

The system 300 also leverages specialized computer models and codes as control algorithms in a smart battery management system (BMS) unique attributes, enables simultaneous solution of those equations that account for the flow of fluid and heat, chemical reactions, current flow and mechanical stress. The equations that describe electrode kinetics and ionic transport will be integrated into the code. This modeling enables designers to account for subtle, but very important effects such as damage of local circuitry and other vehicular components by the pyrotechnic venting of hot gases. Effective cooling systems, and engineered "fire breaks" and "internal fire suppression methods" can be included. The system 300 has many uses, for example the system 300 has use in connection with high capacity lithium ion battery packs for electric and hybrid-electric vehicles, naval systems, aerospace systems, grid storage, and uninterruptable power supplies.

Lithium-ion batteries are back in the crosshairs after two safety incidents aboard the Boeing 787 Dreamliner airplanes in January 2013. Headlines everywhere drew readers to stories about flaming and smoldering batteries. Reports warned of these popular power packs' tendency to overheat and burst into flames. Broadcasts pointed out that fires in portable electronic devices several years ago prompted manufacturers to recall millions of Li-ion laptop batteries.

As a result of the enormous number of Li-ion cells manufactured each year, estimated to be about 4 billion in 2012, some of those failures can lead to fires and serious safety incidents. Although the probability is tiny, the potential for mishap grows as Li-ion battery use surges. Adding to the concern is the scale issue. Li-ion batteries range from palm-sized or smaller packs weighing an ounce or less to 400-plus-lb electric vehicle batteries, and the larger devices can cause more serious problems if they fail.

The present invention provides a system for monitoring parameters of a lithium ion battery pack, wherein the lithium ion battery pack includes a multiplicity of individual lithium ion battery cells, including: sensor units connected to each of the lithium ion battery cells that sense the parameters of each individual lithium ion battery cell and provide a signal containing the parameters of each individual lithium ion battery cell, and a management system that monitors the signal from the sensor units and monitors the parameters of the lithium ion battery pack. The system for monitoring parameters of a lithium ion battery pack includes a system connecting the sensor units with the management system. In one embodiment the system for monitoring parameters of a lithium ion battery pack is a copper wire system. In another embodiment the system for monitoring parameters of a lithium ion battery pack is an optical fiber system. In another embodiment the system for monitoring parameters of a lithium ion battery pack is a radio frequency identification system.

The present invention provides a system for monitoring parameters of a lithium ion battery pack with a radio frequency identification system that includes a radio frequency identification and sensor unit connected to each of the individual lithium ion battery cells having an antenna, and wherein the radio frequency identification and sensor unit connected to each of the individual lithium ion battery cells operates in a completely passive mode obtaining the power for radio frequency transmission of the parameters of each individual lithium ion battery cell through the antenna. The radio frequency identification system includes a radio frequency identification and sensor unit connected to each of the individual lithium ion battery cells, wherein each of the individual lithium ion battery cells can provide power, and wherein the radio frequency identification and sensor unit connected to each of the individual lithium ion battery cells operates in an active mode obtaining the power for radio frequency transmission of the parameters of each individual lithium ion battery cell from the individual lithium ion battery cell. The radio frequency identification system includes a radio frequency identification and sensor unit connected to each of the individual lithium ion battery cells, wherein the parameters include cell temperature; wherein the radio frequency identification and sensor unit comprises a radio frequency identification and sensor unit connected to each of the individual lithium ion battery cells that senses the temperature of each individual lithium ion battery cell and provides radio frequency transmission of the temperature of each individual lithium ion battery cell, and wherein the management system that monitors the transmissions from the radio frequency identification and sensor units and monitors the temperature of the individual lithium ion battery cells of the lithium ion battery pack. The radio frequency identification system includes a radio frequency identification and sensor unit connected to each of the individual lithium ion battery cells, wherein each of the individual lithium ion battery cells has a core, wherein the radio frequency identification and sensor unit includes a temperature sensor embedded in the core of each of the individual lithium ion battery cell that directly measures the core temperature, and wherein the management system that monitors the transmissions from the radio frequency identification and sensor units monitors the core temperature of each individual lithium ion battery cells of the lithium ion battery pack.

The present invention provides a system for monitoring parameters of a lithium wherein the radio frequency identification system includes a radio frequency identification and sensor unit connected to each of the individual lithium ion battery cells, wherein the parameters include internal impedance of the cell; wherein the radio frequency identification and sensor unit includes a tag circuit that provides a variable frequency electromagnetic stimulus with amplitude and phase and monitors the amplitude and phase to sense the internal impedance of the cell, and wherein the management system that monitors the transmissions from the radio frequency identification and sensor units monitors the internal impedance of the cells of the lithium ion battery pack. The tag circuit that provides a variable frequency electromagnetic stimulus that ranges in frequency from 0.001 to 500,000 Hertz and wherein the radio frequency identification and sensor unit monitors the variable frequency electromagnetic stimulus that ranges in frequency from 0.001 to 500,000 Hertz to sense the internal impedance of the cell.

The present invention provides a system for monitoring parameters of a lithium ion battery pack wherein the radio frequency identification system includes a radio frequency identification and sensor unit connected to each of the individual lithium ion battery cells, wherein the parameters include acoustic emissions as early indicators of failure of the cell; wherein the radio frequency identification and sensor unit senses the acoustic emissions and monitors the acoustic emissions as early indicators of failure of the cell, and wherein the management system that monitors the transmissions from the radio frequency identification and sensor units monitors the acoustic emissions as early indicators of failure of the cells of the lithium ion battery pack.

The present invention provides a method of monitoring parameters of a lithium battery pack that includes a multiplicity of individual lithium battery cells, including the steps of: providing radio frequency identification and detection of each of the individual lithium battery cells for identification and detection of the parameters of each individual lithium battery cell, and monitoring the radio frequency identification and detection of each individual lithium battery cell for monitoring the parameters of the lithium battery pack. The step of providing radio frequency identification and detection of each of the individual lithium battery cells comprises providing an antenna connected to each individual lithium battery cell and providing power for radio frequency transmission of the parameters of each individual lithium ion battery cell in a completely passive mode by obtaining the power for radio frequency transmission of the parameters of each individual lithium ion battery cell through the antenna. The step of providing radio frequency identification and detection of each of the individual lithium battery cells comprises using power for radio frequency transmission of the parameters of each individual lithium ion battery cell in an active mode by obtaining the power for radio frequency transmission of the parameters of each individual lithium ion battery cell from the individual lithium ion battery cell. The monitoring parameters of a lithium battery pack include cell temperature, wherein the step of providing radio frequency identification and detection of each of the individual lithium battery cells comprises sensing the temperature of each individual lithium ion battery cell and providing radio frequency transmission of the temperature of each individual lithium ion battery cell, and wherein the step of monitoring the radio frequency identification and detection of each individual lithium battery cell comprises monitoring the temperature of each individual lithium battery cell. The method of monitoring parameters of a lithium wherein each individual lithium ion battery cell has a core, and wherein the step of sensing the temperature of each individual lithium ion battery cell and providing radio frequency transmission of the temperature of each individual lithium ion battery cell comprises embedding a temperature sensor embedded in the core of each of the individual lithium ion battery cell and directly measuring the core temperature. The method of monitoring parameters of a lithium battery pack wherein the parameters include internal impedance of the cell, wherein the step of providing radio frequency identification and detection of each of the individual lithium battery cells comprises providing a tag circuit to produce a variable frequency electromagnetic stimulus with amplitude and phase, and monitoring the amplitude and phase to sense the internal impedance of the cell. The method of monitoring parameters of a lithium battery pack wherein the parameters include acoustic emissions as early indicators of failure of the cell, wherein the step of providing radio frequency identification and detection of each of the individual lithium battery cells comprises monitoring the acoustic emissions as early indicators of failure of the cell, and wherein the step of monitoring the radio frequency identification and detection of each individual lithium battery cell comprises monitoring the transmissions from the radio frequency identification and sensor units of the acoustic emissions as early indicators of failure of the cells of the lithium ion battery pack.

The present invention provides a method of monitoring parameters of a lithium battery pack wherein the parameters include optical emissions due to the pyrotechnic displays that accompany venting and early indications of the state-of-health of the cell, wherein the step of providing radio frequency identification and detection of each of the individual lithium battery cells comprises monitoring the optical emissions due to the pyrotechnic displays, and wherein the step of monitoring the radio frequency identification and detection of each individual lithium battery cell comprises monitoring the optical emissions due to the pyrotechnic displays from the radio frequency identification and sensor units of the acoustic emissions as early indications of the state-of-health of the cells of the lithium ion battery pack.

The present invention provides a method of thermally managing a lithium-ion battery pack from thermal runaway events, including, providing a lithium-ion battery pack including: one or more individual cells in stacked arrangement with a plurality of cooling passages there between; at least one internal cooling structure positioned in the stack arrangement and containing an inert high pressure refrigerant to passively remove heat from the stacked arrangement by liquid-vapor phase change; at least one sensor positioned in the stacked arrangement; and an injector system adapted to inject the refrigerant from the at least one internal cooling structure and into the plurality of cooling passages; and upon detecting a thermal runaway event by the at least one sensor, activating the injector system to inject the refrigerant into the cooling passages so that the thermal runaway event may be actively and rapidly quenched.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A battery management apparatus with thermally integrated fire suppression, comprising:
   a battery housing having a housing wall and an area inside of said housing wall and within said battery housing;
   a gas venting system outside of said housing wall and outside of said area within said battery housing, said gas venting system operably connected to said area within said battery housing;
   a first battery cell within said area within said battery housing,
   a second battery cell within said area within said battery housing, and
   additional battery cells within said area within said battery housing, wherein said first battery cell, said second battery cell, and said additional battery cells are all of the battery cells inside of said battery housing wherein said first battery cell, said second battery cell, and said additional battery cells can produce heat;
   two or more integrated cooling sheets inside of said housing wall and within said area within said battery housing and operably connected to said first battery cell, said second battery cell, and said additional battery cells, said integrated cooling sheets linked together and each of said integrated cooling sheets including
   an evaporator,
   a condenser, and
   a refrigerant wherein said heat is transferred to said evaporator and said refrigerant and wherein said heat in said refrigerant is transferred to said condenser;
   two or more cooling passages between said first battery cell, said second battery cell, and said additional battery cells;
   at least one of said integrated cooling sheets operatively connected to one or more of said cooling passages;
   a first radio frequency identification sensor within said area within said battery housing and connected directly to said first battery cell,
   a second radio frequency identification sensor within said area within said battery housing and connected directly to said second battery cell, and
   additional radio frequency identification sensors within said area within said battery housing and connected directly to said additional battery cells and
   a gas venting system radio frequency identification sensor outside of said housing wall and outside of said area within said battery housing,
   wherein said first radio frequency identification sensor connected directly to said first battery cell is adapted to detect a thermal runaway event related to said first battery cell,
   wherein said second radio frequency identification sensor connected directly to said second battery cell is adapted to detect a thermal runaway event related to said second battery cell, and
   wherein said additional radio frequency identification sensors connected directly to said additional battery cells are adapted to detect a thermal runaway event related to said additional battery cells,
   and wherein said gas venting system radio frequency identification sensor is operably connected to said gas venting system; and
   a battery management system operably connected to said first radio frequency identification sensor connected directly to said first battery cell, said second radio frequency identification sensor connected directly to said second battery cell, and said additional radio frequency identification sensors connected directly to said additional battery cells, and operably connected to said gas venting system radio frequency identification sensor and to said at least one integrated cooling sheet, to detect said thermal runaway event and wherein said battery management system is adapted to inject said refrigerant from said at least one integrated cooling sheet into at least one of said two or more cooling passages upon the detection of said thermal runaway event and to activate said gas venting system, so that said thermal runaway event is rapidly quenched.

2. A method of thermally managing a battery pack from thermal runaway events, comprising,
   providing a battery housing having a housing wall and an area inside of said housing wall and within said battery housing;
   providing a gas venting system outside of said housing wall and outside of said area within said battery housing that is operably connected to said battery housing;
   providing a first battery cell within said area within said battery housing,
   providing a second battery cell within said area within said battery housing, and
   providing additional battery cells within said area within said battery housing,
   wherein said first battery cell, said second battery cell, and said additional battery cells are all of the battery cells inside of said battery housing and wherein said first battery cell, said second battery cell, and said additional battery cells can produce heat;
   providing a plurality of integrated cooling sheets inside of said housing wall and within said area within said battery housing wherein there is a cooling sheet between said first battery cell and said second battery cell and a cooling sheet between said second battery cell and said additional battery cells wherein said integrated cooling sheets including an evaporator, a condenser, and a refrigerant wherein the heat is transferred to said evaporator and said refrigerant and wherein the heat in said refrigerant is transferred to said condenser;
   linking said integrated cooling sheets together;
   providing cooling passages between said first battery cell and said second battery cell and between said second battery cell and said additional battery cells wherein said plurality of integrated cooling sheets are operatively connected to said cooling passages;
   providing a first radio frequency identification sensor within said area within said battery housing and connected directly to said first battery cell,
   providing a second radio frequency identification sensor within said area within said battery housing and connected directly to said second battery cell,
   providing additional radio frequency identification sensors within said area within said battery housing and connected directly to said additional battery cells,
   providing a gas venting system radio frequency identification sensor outside of said housing wall and outside of said area within said battery housing, said gas venting system radio frequency identification sensor operably connected to said gas venting system; and
   providing a battery management system operably connected to said first radio frequency identification sensor connected directly to said first battery cell, said second radio frequency identification sensor connected directly to said second battery cell, and said additional radio frequency identification sensors connected directly to said additional battery cells, wherein said first radio frequency identification sensor, said second radio frequency identification sensor, and said additional radio frequency identification sensors are adapted to detect said thermal runaway event and said battery management system is adapted to inject said refrigerant from said plurality of integrated cooling sheets into said cooling passages and to activate said gas venting system upon the detection of said thermal runaway event so that said thermal runaway event is rapidly quenched.

3. An apparatus for battery management and thermally integrated fire suppression, comprising:

a battery housing having a housing wall and an area inside of said housing wall and an area within said battery housing;

a gas venting system outside of said housing wall and outside of said area within said battery housing, said gas venting system operably connected to said battery housing;

a first lithium ion battery cell inside of said area within said battery housing, wherein said first lithium ion battery cell can produce heat, a second lithium ion battery cell inside of said area within said battery housing, wherein said second lithium ion battery cell can produce heat, additional lithium ion battery cells inside of said area within said battery housing, wherein said additional lithium ion battery cells can produce heat, wherein said first lithium ion battery cell, said second lithium ion battery cell, and said additional lithium ion battery cells are the only battery cells inside of said area within said battery housing, two or more integrated cooling sheets inside of said housing wall and within said area within said battery housing and operably connected to said battery housing and connected to said first lithium ion battery cell, said second lithium ion battery cell, and said additional lithium ion battery cells, said integrated cooling sheets linked together and each of said integrated cooling sheets including an evaporator, a condenser, and a refrigerant wherein said heat is transferred to said evaporator and said refrigerant and wherein said heat in said refrigerant is transferred to said condenser, cooling passages between said first lithium ion battery cell, said second lithium ion battery cell, and said additional lithium ion battery cells, with at least one of said integrated cooling sheets operatively connected to one or more of said cooling passages, a first radio frequency identification sensor connected directly to said first lithium ion battery cell inside of said battery housing, a second radio frequency identification sensor connected directly to said second lithium ion battery cell, additional second radio frequency identification sensors connected directly to said additional lithium ion battery cells, at least one gas venting system radio identification sensor outside of said housing wall and outside of said area within said battery housing operatively connected to said gas venting system; and a battery management system operatively connected to said first radio frequency identification sensors sensor, said second radio frequency identification sensor, and said additional radio frequency identification sensors, and operatively connected to said at least one gas venting system radio identification sensor, and operatively connected to said gas venting system, wherein said first radio frequency identification sensor or said second radio frequency identification sensor or said additional radio frequency identification sensors can detect said thermal runaway event and said battery management system is adapted to inject said refrigerant from said at least one integrated cooling sheet into at least one of said cooling passages and to activate said gas venting system when said first lithium ion battery cell or said second lithium ion battery cell or said additional lithium ion battery cells exhibit thermal runaway.

* * * * *